July 27, 1965   M. A. MOLNAR   3,196,648

IMPACT EXTRUSION PROCESS

Filed April 30, 1962

INVENTOR.
Martin A. Molnar
BY
C. Kenneth Bjork
AGENT

# United States Patent Office 3,196,648
Patented July 27, 1965

3,196,648
IMPACT EXTRUSION PROCESS
Martin A. Molnar, Sanford, Mich., assignor to The Dow Chemical Company, Midland, Mich., a corporation of Delaware
Filed Apr. 30, 1962, Ser. No. 190,933
2 Claims. (Cl. 72—38)

This invention relates to an impact extrusion process and more particularly is concerned with an improvement in an impact extrusion process used in forming thin-walled metal articles.

Impact extrusion, as is understood in the art, is a forming process wherein a blank to be shaped is positioned at the die face of an impact extruder and a punch mating with the die is advanced against the blank thereby to deform and extrude the blank into a shaped article in accordance with the shape of the punch and die.

The impact extrusion of thin-walled metal articles as practiced conventionally frequently results in buckling of the walls of the formed article either during the extrusion process or in subsequent stripping of the punch from the article. Buckling during extrusion results primarily from frictional force between both the punch and the part being formed and the die itself and the part being formed. Buckling during stripping results primarily from frictional forces between the punch and the walls of the formed article.

Conventionally, frictional resistance is reduced by fluting the punch stem. This is not entirely satisfactory as such mechanical changes to the punch may, (1) leave undesired surface markings on the formed part, (2) actually be inadequate to prevent buckling, and, (3) contribute little to heat transfer from the part.

Known art depends on stripping assisted by air introduced through an internal passage extending the length of the punch and exiting through the bottom of the punch against the bottom of the formed part. In such an operation, air pressure must be kept at a low level so as to not bulge or rupture the formed part.

Now unexpectedly in accordance with the present improved process frictional restraint between the punch, die and part being formed during the extrusion and stripping substantially is eliminated. Rapid heat transfer whereby cooling of the metal in the formed walls is such that the part has strength sufficiently high to support loads imposed by friction also is provided by the instant improved process. Further, the flow stress in the extruded product is raised to a high level when using the instant process.

In general, this improvement in impact extrusion processes consists essentially of providing a gas film during the forming operation between the walls of the punch and the part being formed.

In practice, a gas is introduced under pressure through apertures extending radially outward from the center of the punch and exiting at the side wall behind the head of the punch. One embodiment of a punch suitable for use in the present process is shown in the figures.

Figure 1:
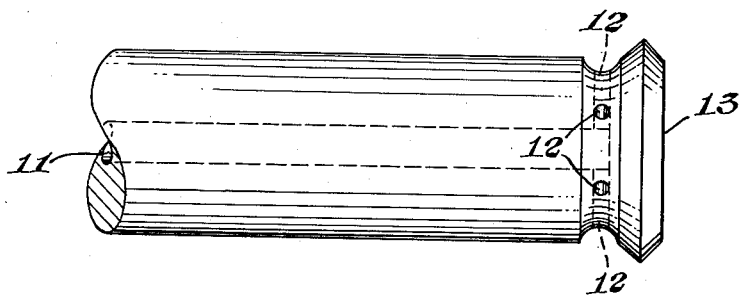
FIGURE 1 shows a planar side view of an impact extruder punch head having a blind center passage and radially extending passages connected to the center passage at one end.
Figure 2:
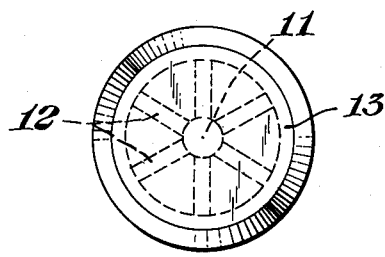
FIGURE 2 is an end-view, looking at the punch head of the punch shown in FIGURE 1.

With such a punch, air or any other gas suitable for use in the present process is carried under pressure through the center passage 11, extending part way down through the punch and being connected to passages 12 which extend radially outward from the center of the punch and exit behind the punch head 13.

Compressed air, because of its ready availability and low cost conveniently is used as the gaseous medium in the instant process. However, any compressible gas that does not undergo undesirable atmospheric degradation and/or detrimental reactions with the extruder or material being formed can be employed. For purposes of clarity, the term "inert" will be used herein to describe gases having the required characteristics set forth hereinbefore.

In this improved impact extrusion process, the pressurized gas flow to the punch is initiated prior to the time the punch head contacts the blank to be formed and the pressurized gas flow is continued at least through the forming cycle. If the pressurized gas is introduced to the punch after the extrusion process has begun, there is substantially no improvement over that shown by conventional processing in the extrusion or stripping action except near the end of the stripping cycle at which time the gas does assist in blowing the can free from the punch.

The gas pressure to be used is not critical except that this must be large enough to maintain an air cushion between the side wall of the punch and the part being formed. However, the pressure must be kept below a maximum value whereby the walls of the formed article are bulged. Ordinarily gas pressures of up to about 300 pounds per square inch gage will be employed. Pressures of from 30 to 90 pounds per square inch gage, as are employed in many industrial operations satisfactorily can be employed.

The present improved process is suitable for use both with impact extrudable ferrous and non-ferrous metals and alloys including, for example, steel, magnesium, aluminum, copper, zinc and the like.

The following example will serve to illustrate further the present invention but is not meant to limit it thereto.

*Example*

Impact extrusion blanks about 1½ inches in diameter by about ⅜ inch thick were cut from a 1½ inch diameter ASTM designated AZ31B magnesium base alloy bar stock—(nominal composition of AZ31B alloy is Al—3%, Mn—0.4%, Zn—1%, balance Mg). The discs were lubricated with a graphite dispersion and preheated in a furnace to a temperature of about 650° F.

A number of runs were made wherein the discs were impact extruded into thin-walled cylindrically shaped cans (wall thickness about 0.05 inch) of about 1½ inches in diameter and about 3 inches deep. For these tests a commercial impact extruder was employed wherein the extruder punch had been modified so as to be similar to the embodiment shown in the figure.

In each of these tests, a heated blank was placed at the die face of the extruder, also maintained at about 650° F., and the punch was advanced in a normal manner to form the cylindrically shaped can.

Multiple runs were made wherein air pressure, at about 60 pounds per square inch gage was passed through the passages of the punch beginning just prior to the time of contact of the punch head with the blank. In all of these tests, stripping of the can from the punch was readily accomplished with no resistance or distortion of the can. In fact, several of the cans remained in the die as the punch was retracted. These, therefore, required no stripping from the punch but easily were pulled from the die cavity.

As a control, one of the graphite treated and heated discs was impact extruded following normal impact extrusion techniques; i.e., no pressurized air was transferred through the apertures of the punch during the forming operation. The resulting can was stripped from the punch only with difficulty and the can was plastically deformed in conforming with the outwardly protruding punch tip configuration as the punch was retracted from the can.

A second control was run wherein pressurized air was introduced through the punch starting after the actual extrusion had begun. The stripping action in this instance was substantially the same as for the control extrusion where no air was used except that near the end of the stripping cycle the air did help to blow the can free from the punch.

In a manner similar to that described for the foregoing example, the impact extrusion of thin-walled steel parts can be improved by providing a cushion of nitrogen gas delivered under pressure, between the wall of an impact extruder punch and article being formed. Likewise, the present improved process can be used in the impact extrusion of thin-walled aluminum vessels. Further, pressurized argon can be employed in a similar process used for impact extruding thin-walled copper articles.

Various modifications can be made in the present invention without departing from the spirit or scope thereof for it is understood that I limit myself only as defined in the appended claims.

I claim:

1. In an impact extrusion process for producing thin-walled extrusions which comprises positioning a blank at the die face of an impact extruder and advancing a punch mating with said die against said blank thereby to deform and extrude said blank in accordance with the shape of said punch and die, said punch having a center passage extending part way therethrough, said center passage connected to outward extending passages which exit from the wall of said punch behind the head of said punch, the improvement which consists essentially of passing a pressurized gas flow through the interior of said punch, said gas flow exiting from said punch at the side wall behind the head of said punch, said gas flow being at a pressure so as to provide a gas cushion between the side wall of the punch and the blank being formed and said gas cushion not undergoing detrimental reaction with the extruder and blank being formed, initiating said pressurized gas flow prior to the time the punch head contacts said blank being formed and continuing said pressurized gas flow at least through said forming cycle.

2. In an impact extrusion process for producing thin-walled magnesium alloy impact extrusions which comprises positioning an impact extrudable magnesium alloy blank at the die face of an impact extruder and advancing a punch mating with said die against said blank thereby to deform and extrude said blank in accordance with the shape of said punch and die, said punch having a center passage extending part way down said punch and being connected at its end to radially outward extending passages which exit behind the head of said punch, the improvement which consists essentially of;

passing pressurized air through the center passage and outward through said radially outward extended passages of said punch, initiating the pressurized air flow prior to the time the punch head contacts said blank being formed, forming a cushion of said pressurized air between the side wall of said punch and the blank being formed as said forming cycle continues, and continuing said pressurized air flow through said center passage of said punch at least throughout said forming cycle.

References Cited by the Examiner

UNITED STATES PATENTS

| | | | |
|---|---|---|---|
| 2,230,840 | 2/41 | Jongedyk | 207—10 |
| 2,756,494 | 7/56 | Sejournet | 207—10.1 |
| 2,778,494 | 1/57 | Kreidler | 207—16 |
| 2,904,830 | 9/59 | Mulrooney | 18—12 |
| 2,987,765 | 6/61 | Cichelli | 18—14 |

OTHER REFERENCES

ASME Paper No. 57–LuB–1 "On Friction and Lubrication at Temperatures to 1000° F. with Particular Reference to Graphite," published 1957, pages 3–7.

CHARLES W. LANHAM, *Primary Examiner.*

WILLIAM W. DYER, JR., MICHAEL V. BRINDISI,
*Examiners.*